United States Patent [19]

Bauer

[11] 3,938,493
[45] Feb. 17, 1976

[54] APPARATUS FOR GRILLING WITH HEAT STORING ARRANGEMENT

[76] Inventor: Hans Bauer, Gutenbergerstr, 20, 7311 Dettingen, Germany

[22] Filed: Jan. 28, 1974

[21] Appl. No.: 437,211

[30] Foreign Application Priority Data
Feb. 9, 1973 Germany............................ 2306347

[52] U.S. Cl. .............................. 126/41 R; 126/25 R
[51] Int. Cl.² ...................... A47J 37/00; F24B 3/00
[58] Field of Search ............... 126/25 R, 25 A, 9 R; 220/335, 333, 332, 41 R, 41 C, 38, 395

[56] References Cited
UNITED STATES PATENTS

| | | | |
|---|---|---|---|
| 2,715,870 | 8/1955 | Rutkowski | 126/25 R |
| 3,088,393 | 5/1963 | Huckabee | 126/25 A X |
| 3,195,442 | 7/1965 | Russell | 126/25 R X |
| 3,279,452 | 10/1966 | Hottenruth et al. | 126/25 R |
| 3,343,527 | 9/1967 | Manteris | 126/25 R |
| 3,391,682 | 7/1968 | King et al. | 126/25 R |
| 3,520,290 | 7/1970 | Winters | 126/25 R |
| 3,734,076 | 5/1973 | Koziol | 126/25 R |

FOREIGN PATENTS OR APPLICATIONS
673,628   11/1963   Canada ...................... 126/25

*Primary Examiner*—William F. O'Dea
*Assistant Examiner*—Harold Joyce

[57] ABSTRACT

Apparatus for grilling with a heat storing arrangement, and a device for heating a grill grate and a grilling basin which contains a heat storage grate. Such apparatus which serves for grilling or roasting different foods, is supplied with a heating device which may consist of a coal burner or a heating element which may be operated by electricity or by gas. Such heating device is generally arranged in a grilling basin which is covered by a grill grate upon which the food to be roasted is put. For pre-heating and storing the heat to keep the food warm, a heat storage device may be attached.

3 Claims, 2 Drawing Figures

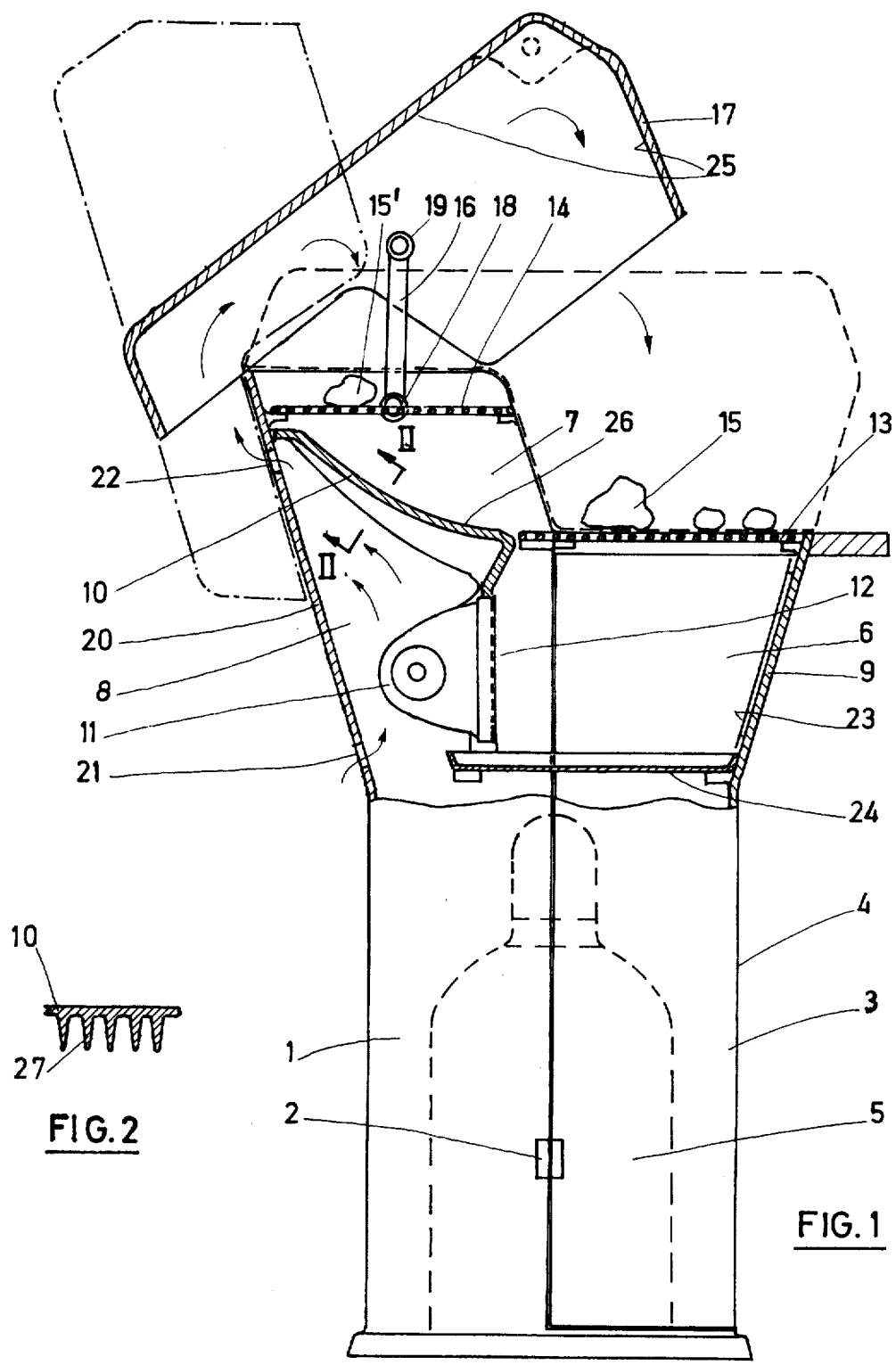

APPARATUS FOR GRILLING WITH HEAT STORING ARRANGEMENT

The invention relates to an apparatus for grilling with a heat storing arrangement and a device for heating a grill grate and a grilling basin which contains a heat storage grate. Such apparatus serves for grilling or roasting different foods like steaks, sausages, toast, chicken, etc. The apparatus is supplied with a heating device which may consist of a coal burner or a heating element which may be operated by electricity or by gas. Such heating device is generally arranged in a grilling basin or pot which is covered by a grill grate upon which the food to be roasted is put. For pre-heating and storing the heat to keep the food warm, a heat storage device may be attached.

In known prior constructions of grilling apparatus, such a heat storage device consists of an additional grate superimposed over the grill grate which serves to keep foods warm or to store them there. Furthermore, the known grilling devices of the prior art have a lid which is pivotally attached to the grill basin and which may be opened to the rear so that the grilling grate and heating grate are completely and freely exposed. Such an attachment has the result that any heat mounting from the heating device very rapidly by-passes the food and escapes without being used. Therefore the food stays hot on the lower part where it touches the grate but immediately cools off on its upper side.

It is therefore among the objects of this invention to utilize the heat storing means of the apparatus in such way that the heat generated by the heating device is utilized optimally, and also that the heat is effective from above upon the top portion of the food. In one embodiment of the present invention, a detour element is provided which covers the grill basin in such way that the warm air stream rising from the heating device is detoured to the grill basin.

Advantageously the detour element is a lid or hood which is adjustably attached to the grill basin and which can be stably positioned at different degrees of opening, and which in its closed position serves to cover the heating storage portion.

The hood together with the grill basin when in closed position constitute a unitary closed housing; however, the hood may be readjusted into different open positions so that it overlaps the grill basin backwardly to different degrees. In such an arrangement the secondary heat, which originates in the heating space, escapes upwardly through openings in the back wall of the heating space, and is then rerouted by the hood to heat from the top the foods which are disposed on the grate.

There is thus created a circulating warm air rotation within the hood which continuously entrains more warm and fresh air from the heating device. Such effect is mainly effected by burners, which radiate their primary heat forwardly. The secondary heat is that which is produced at the back of the burner; such secondary heat in prior devices escaped unused.

To attach the hood to the grill basin there is advantageously provided a pivotally adjustable link or arm on the grill basin to which the hood is likewise pivotally attached.

In another preferred embodiment of the present invention a gas guiding means with a radiation area adjacent the heating grate is attached to the grill basin. Such element guides the warm air stream under the hood, and on the other hand radiates warm air toward the food disposed on the storage warming grate. The bottom side of such gas guiding means, adjacent the heating arrangement may be provided with fins to aid in its heating. The warm air mounting from the heating device and passing between the fins is therefore once more re-heated. The fins and the passages or grooves therebetween act, in addition, as a convector and increases the velocity of the circulating warm air.

The advantages of the present invention are such that the foods to be grilled are not only kept warm from the bottom but are also evenly kept warm from the top. This means an optimal use of the heat generated by the heating arrangement, which means a better efficiency of the grill and furthermore makes possible the use of the grill for heating foods that especially require heating from the top, for example pizza, to have them ready in a short time.

Furthermore, the circulating warm air cycle prevents the escape of heat as well as cooking odors from underneath the food, and renders the cooking operation more pleasant to the person operating the apparatus.

A preferred embodiment of the apparatus of the invention is described in the accompanying drawings, in which:

FIG. 1 is a view of the apparatus partially in elevation; and

FIG. 2 is a fragmentary sectional view of the gas guiding element, the section being taken along the line II—II in FIG. 1.

The apparatus of the invention is mounted upon a support made up of back and front housing part 1 and 3, respectively, which are pivotally connected by one or more hinges 2 and are selectively locked together by one or more locks or clasps (not shown). The housing 4 at the bottom encloses gas containers 5 and at the top has a grill pot or basin 9 enclosing portion 6, a storage area 7, and a burner space 8. The burner space 8 is separated from the grill portion 6 and the storage area 7 by a gas guiding and connection element 10 to which the heating arrangement 11 is attached.

Element 10 and heating arrangement 11 are constructed and connected so as to be easily mounted and taken apart, as for cleaning. The illustrated heating arrangement 11 is an infrared gas radiator from the heating surface 12 of which the primary heat is radiated into the grill space 6. The top of the grill space 6 is provided with a grill grate 13, and the storage area 7 is covered by a warming storage grate 14, foods 15, 15' to be grilled and kept warm being disposed on the respective grates.

On the upper rim of the back housing part 1 a hood 17 is pivotally attached by means of two links 16 on lower and upper joints 18, 19, respectively. In FIG. 1 the hood in a middle open position is shown by means of a solid line. The hood is shown in a closed position by a dash line, and is shown in a completely open position by a phantom or dot-dash line.

The attachment of hood 17 on the links 16 permits a selectively pivotal adjustment of the hood 17 with respect to the grill basin 9, friction in joints 18, 19 arising from the tension of the disc springs or spring washers (not shown) in such joints permitting the hood 17 to be maintained in a desired position from and including its fully closed and its fully open position. In the area of the burner space 8 on the back wall portion 20 of the housing back 1, there are provided a lower entry opening 21 and an upper exit opening 22, for the airstream which flows toward and from the heating arrangement 11, respectively, as shown by the arrows in FIG. 1.

When the apparatus is in operation, the heating surface 12 radiates the primary heat directly upwardly to the foods 15 disposed on grate 13. A reflector 23 mounted on grill basin 9 increases such heating power. Dripping fat is collected in a downwardly attached dripping plate 24.

According to the construction of heating arrangement 11, secondary heat is being guided backwardly and creates a warm air suction. Oxygen needed for the burning of gas is sucked in through the openings 21. The rising warm air hits the element 10, which reroutes it to the back wall 20, so that it may escape via the exit openings 22 from the burner space 8.

During operation of the apparatus, hood 17 more or less covers the grill basin 9, so that the ascending warm air is returned via the re-routing plane 25 of hood 17 in the direction of the grill basin 9 and so influences and heats from above the foods 15' disposed on grate 14. The intensity of such re-routed warm air may be regulated by adjusting the position of the hood 17, the upper surface 26 of the element 10 functions as a radiation plane from there additional heat is radiated against warming storage grate 14.

In a further preferred embodiment of the invention the element 10 is provided with fins or ribs 27 (FIG. 2), whereby the heating of the element 10 by the burner 11 is carried out more efficiently.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. In a grilling apparatus which includes (a) a grill basin having forward and rear walls, (b) a heating element, grilling grate and heat-retaining warming storage grate operatively associated in the grill basin, (c) a hood having depending forward and rear walls defining a hollow channel opening toward the grill basin, and (d) means for pivotally mounting the hood to the grill basin for movement between a closed position and a fully open position with respect to the grill basin, the pivotal mounting means being located so that the rear wall of the hood overlaps the rear wall of the grill basin when the hood is pivoted away from the closed position, the pivotal mounting means comprising means for stably supporting the hood in a desired position intermediate the closed position and a fully open position, the improvement wherein the rear wall of the grill basin has openings therethrough for passage of a heated air stream out of the grill basin, whereby the overlapping portion of the hood chamber receives the heated air stream exiting from the rear wall of the grill basin via at least one of the openings therein when the hood is in an open position.

2. Grilling apparatus according to claim 1, further comprising an air guiding and connecting plate coupled to the heating element and arranged on the grill basin below the warming storage grate to direct radiation toward the warming storage grate.

3. Grilling apparatus according to claim 2, wherein the air guiding and connecting plate is provided with fins and interposed grooves on its lower surface adjacent the heating element.

* * * * *